United States Patent
Allen et al.

(10) Patent No.: US 9,890,291 B2
(45) Date of Patent: *Feb. 13, 2018

(54) ACRYLATE INK COMPOSITIONS FOR INK-BASED DIGITAL LITHOGRAPHIC PRINTING

(71) Applicant: XEROX CORPORATION, Norwalk, CT (US)

(72) Inventors: C. Geoffrey Allen, Waterdown (CA); Carolyn Moorlag, Mississauga (CA); Mihaela Maria Birau, Hamilton (CA); Aurelian Valeriu Magdalinis, Newmarket (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,098

(22) Filed: Feb. 16, 2017

(65) Prior Publication Data

US 2017/0158891 A1 Jun. 8, 2017

Related U.S. Application Data

(63) Continuation-in-part of application No. 14/610,437, filed on Jan. 30, 2015.

(51) Int. Cl.
*C09D 11/101* (2014.01)
*C09D 11/037* (2014.01)
(Continued)

(52) U.S. Cl.
CPC .............. *C09D 11/101* (2013.01); *B41F 7/02* (2013.01); *C09D 11/037* (2013.01); *C09D 11/102* (2013.01)

(58) Field of Classification Search
CPC ... C09D 11/101; C09D 11/037; C09D 11/326; C09D 11/104; B41F 7/02
See application file for complete search history.

(56) References Cited

U.S. PATENT DOCUMENTS

| 3,945,957 A | 3/1976 | Noshiro et al. |
| 4,304,601 A | 12/1981 | Sharp |
(Continued)

FOREIGN PATENT DOCUMENTS

| EP | 1235863 B1 | 1/2005 |
| JP | 03069954 A | 8/1989 |
(Continued)

OTHER PUBLICATIONS

Badesha, et al. "Fluorosilicone composite and Formulation Process for Imaging Plate", U.S. Appl. No. 15/222,364, filed Jul. 28, 2016.
(Continued)

*Primary Examiner* — Alison L Hindenlang
*Assistant Examiner* — Michael Robinson
(74) *Attorney, Agent, or Firm* — MH2 Technology Law Group LLP

(57) ABSTRACT

An ink composition, including 20% or less pigment, 10% or less dispersant, between 50% and 75% acrylate with acrylate being a mixture of a trifunctional acrylate monomer, a tetrafunctional polyester acrylate oligomer, and an optional difunctional polyester acrylate oligomer, 12% or less photoinitiator, and wherein an effective amount of the trifunctional acrylate monomer in combination with the tetrafunctional polyester acrylate oligomer, and the optional difunctional polyester acrylate oligomer provides the ink composition with a near-zero shear viscosity between $2 \times 10^6$ cP and $5 \times 10^7$ cP at 25° C., and between $2 \times 10^5$ cP and $4 \times 10^6$ cP at 60° C., and a 60 second tack between 40 and 65 g-m at 25° C., and between 10 and 20 g-m at 60° C., and an
(Continued)

energy of activation between 15 and 180 at kJ/mol at 1 rad/s, and between 40 and 120 at kJ/mol at 100 rad/s.

16 Claims, 3 Drawing Sheets

(51) Int. Cl.
*B41F 7/02* (2006.01)
*C09D 11/102* (2014.01)

(56) References Cited

U.S. PATENT DOCUMENTS

| | | | |
|---|---|---|---|
| 4,403,550 A | 9/1983 | Sharp | |
| 4,445,432 A | 5/1984 | Ford, Jr. et al. | |
| 4,711,818 A | 12/1987 | Henry | |
| 4,806,391 A | 2/1989 | Shorin | |
| 4,911,999 A | 3/1990 | Legere | |
| 4,927,180 A | 5/1990 | Trundle et al. | |
| 5,085,698 A | 2/1992 | Ma et al. | |
| 5,502,476 A | 3/1996 | Neal et al. | |
| 5,834,118 A | 11/1998 | Ranby et al. | |
| 5,886,067 A | 3/1999 | Li et al. | |
| 5,977,202 A | 11/1999 | Chawla et al. | |
| 6,114,489 A | 9/2000 | Vicari et al. | |
| 6,140,392 A | 10/2000 | Kingman et al. | |
| 6,239,189 B1 | 5/2001 | Narayan et al. | |
| 6,329,446 B1 | 12/2001 | Sacripante et al. | |
| 6,348,561 B1 | 2/2002 | Mychajlowskij et al. | |
| 6,664,015 B1 | 12/2003 | Sacripante et al. | |
| 6,896,937 B2 | 5/2005 | Woudenberg | |
| 7,022,752 B2 | 4/2006 | Hayashi et al. | |
| 7,151,153 B2 | 12/2006 | Bruchmann et al. | |
| 7,202,006 B2 | 4/2007 | Chopra et al. | |
| 7,208,258 B2 | 4/2007 | Gervasi et al. | |
| 7,322,688 B2 | 1/2008 | Woudenberg | |
| 7,538,070 B2 | 5/2009 | Iftime et al. | |
| 7,556,844 B2 | 7/2009 | Iftime et al. | |
| 7,674,326 B2 | 3/2010 | Iftime et al. | |
| 7,708,396 B2 | 5/2010 | Iftime et al. | |
| 7,718,325 B2 | 5/2010 | Norsten et al. | |
| 7,723,398 B2 | 5/2010 | Ilg et al. | |
| 7,909,924 B2 | 3/2011 | Krishnan et al. | |
| 7,964,271 B2 | 6/2011 | Norsten et al. | |
| 8,001,889 B2 | 8/2011 | Gaugenrieder et al. | |
| 8,124,791 B2 | 2/2012 | Shinjo et al. | |
| 8,158,693 B2 | 4/2012 | Breton et al. | |
| 8,222,313 B2 | 7/2012 | Iftime et al. | |
| 8,771,787 B2 | 7/2014 | Breton et al. | |
| 8,895,400 B2 | 11/2014 | Seo et al. | |
| 8,934,823 B1 | 1/2015 | Pickering et al. | |
| 9,011,594 B1 | 4/2015 | Kanungo et al. | |
| 9,193,209 B2 | 11/2015 | Dooley et al. | |
| 9,283,795 B1 | 3/2016 | Kanungo et al. | |
| 9,359,512 B2 | 6/2016 | Moorlag et al. | |
| 9,387,661 B2 | 7/2016 | Zirilli | |
| 9,422,436 B2 | 8/2016 | Birau et al. | |
| 2002/0040073 A1 | 4/2002 | Stone et al. | |
| 2002/0107303 A1 | 8/2002 | Miyabashi et al. | |
| 2003/0003323 A1 | 1/2003 | Murakami et al. | |
| 2003/0018100 A1 | 1/2003 | Foucher et al. | |
| 2003/0021961 A1 | 1/2003 | Ylitalo et al. | |
| 2003/0044691 A1 | 3/2003 | Setthachayanon et al. | |
| 2003/0073762 A1 | 4/2003 | Jung et al. | |
| 2003/0149130 A1 | 8/2003 | Kondo | |
| 2003/0187098 A1 | 10/2003 | Chen et al. | |
| 2004/0009363 A1 | 1/2004 | Shouldice et al. | |
| 2004/0063809 A1 | 4/2004 | Fu et al. | |
| 2004/0132862 A1 | 7/2004 | Woudenberg | |
| 2004/0233465 A1 | 11/2004 | Coyle et al. | |
| 2005/0166783 A1 | 8/2005 | Ylitalo et al. | |
| 2006/0054040 A1 | 3/2006 | Daems et al. | |
| 2006/0110611 A1 | 5/2006 | Badesha et al. | |
| 2007/0073762 A1 | 3/2007 | Adamson et al. | |
| 2007/0166479 A1 | 7/2007 | Drake et al. | |
| 2007/0257976 A1 | 11/2007 | Takabayashi | |
| 2007/0259986 A1 | 11/2007 | Elwakil et al. | |
| 2008/0090929 A1 | 4/2008 | Wilson et al. | |
| 2008/0139743 A1 | 6/2008 | Krishnan et al. | |
| 2008/0241485 A1 | 10/2008 | Shimohara et al. | |
| 2008/0258345 A1 | 10/2008 | Bens et al. | |
| 2008/0317957 A1 | 12/2008 | Overbeek et al. | |
| 2009/0038506 A1 | 2/2009 | Odell et al. | |
| 2009/0104373 A1 | 4/2009 | Vanbesien et al. | |
| 2009/0110843 A1 | 4/2009 | Halahmi et al. | |
| 2009/0135239 A1 | 5/2009 | Chretien et al. | |
| 2009/0280302 A1 | 11/2009 | Fukumoto et al. | |
| 2010/0016513 A1 | 1/2010 | Hartmann et al. | |
| 2010/0020123 A1 | 1/2010 | Hirato | |
| 2010/0067056 A1 | 3/2010 | Rich et al. | |
| 2010/0214373 A1 | 8/2010 | Carr et al. | |
| 2010/0239777 A1 | 9/2010 | Nakajima et al. | |
| 2010/0304040 A1 | 12/2010 | Chretien et al. | |
| 2011/0045199 A1 | 2/2011 | Cong | |
| 2011/0141187 A1 | 6/2011 | Takabayashi | |
| 2011/0188023 A1 | 8/2011 | Rondon et al. | |
| 2011/0196058 A1 | 8/2011 | Breton et al. | |
| 2011/0243629 A1 | 10/2011 | Roberts et al. | |
| 2011/0262711 A1 | 10/2011 | Chopra et al. | |
| 2012/0040156 A1 | 2/2012 | Ohashi et al. | |
| 2012/0103212 A1 | 5/2012 | Stowe et al. | |
| 2012/0103213 A1 | 5/2012 | Stowe et al. | |
| 2012/0103218 A1 | 5/2012 | Stowe et al. | |
| 2012/0103221 A1 | 5/2012 | Stowe et al. | |
| 2012/0157561 A1 | 6/2012 | Gould et al. | |
| 2012/0309896 A1 | 12/2012 | Carlini et al. | |
| 2013/0050366 A1 | 2/2013 | Sasada et al. | |
| 2013/0085208 A1 | 4/2013 | Norikoshi et al. | |
| 2013/0104756 A1 | 5/2013 | Stowe et al. | |
| 2013/0305946 A1 | 11/2013 | Iftime et al. | |
| 2013/0305947 A1 | 11/2013 | Iftime et al. | |
| 2013/0307913 A1 | 11/2013 | Kawashima et al. | |
| 2013/0310479 A1 | 11/2013 | Lee et al. | |
| 2013/0310517 A1 | 11/2013 | Lee et al. | |
| 2013/0324653 A1 | 12/2013 | Bollard et al. | |
| 2014/0235752 A1 | 8/2014 | Gharapetian et al. | |
| 2014/0333704 A1 | 11/2014 | Takabayashi et al. | |
| 2014/0340455 A1 | 11/2014 | Breton et al. | |
| 2015/0077501 A1 | 3/2015 | Breton et al. | |
| 2015/0093690 A1 | 4/2015 | Shimura et al. | |
| 2015/0116416 A1 | 4/2015 | Belelie et al. | |
| 2015/0170498 A1 | 6/2015 | Beggs et al. | |
| 2015/0174887 A1 | 6/2015 | Moorlag et al. | |
| 2015/0175820 A1 | 6/2015 | Breton et al. | |
| 2015/0175821 A1 | 6/2015 | Moorlag et al. | |
| 2016/0090490 A1 | 3/2016 | Moorlag et al. | |
| 2016/0176185 A1 | 6/2016 | Kanungo et al. | |
| 2016/0177113 A1 | 6/2016 | Allen et al. | |
| 2016/0222231 A1 | 8/2016 | Allen et al. | |
| 2016/0230027 A1 | 8/2016 | Birau et al. | |
| 2016/0237290 A1 | 8/2016 | Moorlag et al. | |
| 2016/0257829 A1 | 9/2016 | Breton et al. | |
| 2016/0264798 A1 | 9/2016 | Allen et al. | |
| 2016/0333205 A1 | 11/2016 | Lee et al. | |

FOREIGN PATENT DOCUMENTS

| | | |
|---|---|---|
| JP | 2011208019 A | 10/2011 |
| WO | WO2013119539 A1 | 8/2013 |

OTHER PUBLICATIONS

Communication dated May 4, 2015, issued in EP Appl. No. 14196839.6, pp. 1-5.
Henri Bouas-Laurent, et al., Organic Photochromism (IUPAC Technical Report), Pure Appl. Chem., vol. 73, No. 4, pp. 639-665, 2001.
Leach, et al., "The Printing Ink Manual, 5th Edition", Blue Print, New York, pp. 84-86, 516, 525, 544-550, 724-726 (1993).
Thesis of Enrique Michel-Sanchez, Impact of Particle Morphology on the Rheology of PCC-Based Coatings, Aug. 2005.
Stowe, et al., "Methods for Rejuvenating an Imaging Member of an Ink-Based Digital Printing System", U.S. Appl. No. 15/240,691, filed Aug. 18, 2016.

(56) References Cited

OTHER PUBLICATIONS

Birau, et al. "Ink Composition and Method of Printing", U.S. Appl. No. 15/377,881, filed Dec. 13, 2016.
Breton, et al. "Aqueous Dispersible Polymer Inks", U.S. Appl. No. 15/442,260, filed Feb. 24, 2017.

ACRYLATE INK COMPOSITIONS FOR INK-BASED DIGITAL LITHOGRAPHIC PRINTING

RELATED APPLICATION

This application is a continuation-in-part of U.S. patent application Ser. No. 14/610,437, entitled "Acrylate Ink Compositions for Ink-Based Digital Lithographic Printing," filed Jan. 30, 2015, which is hereby incorporated by reference in its entirety.

FIELD OF DISCLOSURE

This disclosure relates to ink compositions for printing on substrates. In particular, the disclosure relates to acrylate ink compositions useful for digital lithographic printing systems.

BACKGROUND

In typical lithographic printing systems, a printing plate is formed to have "image regions" formed of a hydrophobic/oleophilic material and "non-image regions" formed of a hydrophilic/oleophobic material. The image regions correspond to the areas on the final print (i.e., the target substrate) that are occupied by ink, whereas the non-image regions correspond to the areas on the final print that are not occupied by said ink. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system.

Typical lithographic and offset printing techniques utilize plates which are permanently patterned, and are therefore useful only when printing a large number of copies of the same image (i.e. long print runs), such as magazines, newspapers, and the like. However, variable data digital lithography or digital offset lithography has been developed as a system which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Digital offset lithography printing systems use offset-type inks that are specifically designed and optimized to be compatible with various subsystems, including ink delivery systems and a laser imaging systems, to enable high quality digital printing at high speed. Related art offset-type inks suffer shortfalls including, but not limited to, (1) being difficult to deliver via preferred inking systems, including anilox roller-type inking systems, (2) being soluble in commonly-employed dampening fluids, such as octamethylcyclotetrasiloxane (D4), (3) causing image background and/or ghosting issues, (4) being costly to manufacture and use, and (5) exhibiting inefficient image transfer. These shortfalls, individually and in combination, tend to narrow a design space within which related art inks are usable in the context of digital offset lithography printing systems.

Accordingly, there is a need to develop inks that exhibit improved qualities and that may address one or all of the above-identified shortfalls.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Additional goals and advantages will become more evident in the description of the figures, the detailed description of the disclosure, and the claims.

The foregoing and/or other aspects and utilities embodied in the present disclosure may be achieved by providing an ink composition, including 20% or less by weight pigment; 10% or less by weight dispersant; between 50% and 70% by weight acrylate, wherein the acrylate includes a trifunctional acrylate monomer, a tetrafunctional polyester acrylate oligomer, and an optional difunctional polyester acrylate oligomer; and between 5 and 10% by weight photoinitiator, based on the total weight of the ink composition, wherein an effective amount of the trifunctional acrylate monomer in combination with the tetrafunctional polyester acrylate oligomer, and the optional difunctional polyester acrylate oligomer provides the ink composition with a near-zero shear (1 rad/s) viscosity of between $2\times10^6$ cP and $5\times10^7$ cP at 25° C., and between $2\times10^5$ cP and $4\times10^6$ cP at 60° C., and a 60 second tack of between 40 g-m and 65 g-m at 25° C., and between 10 g-m and 20 g-m at 60° C.; and an energy of activation of between 15 and 180 at kJ/mol at 1 rad/s, and between 40 and 120 at kJ/mol at 100 rad/s.

In another embodiment, the ink composition further includes 1.5% or less by weight stabilizer, based on the total weight of the ink composition; and 12% or less by weight rheology modifier, based on the total weight of the ink composition.

In an embodiment of the ink composition, the acrylate includes between 2 and 20% by weight a trifunctional acrylate monomer, between 40 and 70% by weight of a tetrafunctional polyester acrylate oligomer, and between 0 and 15% by weight of a difunctional polyester acrylate oligomer, wherein the amounts are based on the total weight of the ink composition.

In another embodiment, the ink composition includes between 15% and 20% by weight pigment; between 4% and 8% by weight dispersant; between 60% and 70% by weight acrylate with between 1 and 18% by weight of a trifunctional acrylate monomer, between 45 and 70% by weight of a tetrafunctional polyester acrylate oligomer, and between 2 and 12% by weight of an optional difunctional polyester acrylate oligomer; between 5% and 10% by weight photoinitiator; between 0.1% and 0.3% by weight stabilizer; and 3% or less by weight rheology modifier, wherein the ink composition has a viscosity between $4\times10^6$ cP and $1\times10^7$ cP at 25° C., and between $4\times10^5$ cP and $8\times10^5$ cP at 60° C., wherein a 60 second tack of the ink composition is between 45 g-m and 55 g-m at 25° C., and between 10 g-m and 15 g-m at 60° C., and wherein the energy of activation of the ink composition is between 15 and 180 at kJ/mol at 1 rad/s and between 40 and 120 at kJ/mol at 100 rad/s.

The foregoing and/or other aspects and utilities embodied in the present disclosure may be achieved by providing a method of preparing an ink composition, including preparing an ink base by mixing the following components: 1.5% or less by weight of a stabilizer, 10% or less by weight of a dispersant, and between 50% and 75% by weight of an acrylate comprising a trifunctional acrylate monomer, a tetrafunctional polyester acrylate oligomer, and an optional difunctional polyester acrylate oligomer; adding between 5% and 10% by weight photoinitiator slowly to the ink base; adding 20% or less by weight of a pigment to the ink base to form a pigmented ink base; and optionally adding 12% or less by weight rheology modifier to the pigmented ink base, wherein the amounts are based on the total weight of the ink composition, and wherein an effective amount of the trifunctional acrylate monomer in combination with the tetrafunctional polyester acrylate oligomer, and the optional difunctional polyester acrylate oligomer provides the ink composition with a near-zero shear viscosity of between $2\times10^6$ cP and $5\times10^7$ cP at 25° C., and between $2.\times10^5$ cP and $4.\times10^6$ cP at 60° C., a 60 second tack of between 40 g-m and 65 g-m at 25° C., and between 10 g-m and 20 g-m at 60° C., and an energy of activation of between 15 and 180 at kJ/mol at 1 rad/s, and between 40 and 120 at kJ/mol at 100 rad/s.

In another embodiment of the method of preparing an ink composition, the stabilizer is present in an amount of between 0.1% and 0.3% by weight; the dispersant is present in an amount of between 4% and 8% by weight; the acrylate is present in an amount of between 60% and 70% by weight with: between 5 and 15% by weight a trifunctional acrylate monomer, between 57 and 70% by weight of a tetrafunctional polyester acrylate oligomer, and between 4 and 10% by weight of an optional difunctional polyester acrylate oligomer; the photoinitiator is present in an amount of between 5% and 10% by weight; the pigment is present in an amount of between 15% and 20% by weight; the rheology modifier is present in an amount of 3% or less by weight; and wherein the trifunctional acrylate monomer in combination with the tetrafunctional polyester acrylate oligomer, and the optional difunctional polyester acrylate oligomer provides the ink composition with a near-zero shear viscosity of between $4\times10^6$ cP and $1\times10^7$ cP at 25° C., and between $4\times10^5$ cP and $8\times10^5$ cP at 60° C.; a 60 second tack of between 45 g-m and 55 g-m at 25° C., and between 10 g-m and 15 g-m at 60° C.; an energy of activation of between 15 and 180 at kJ/mol at 1 rad/s, and between 40 and 120 at kJ/mol at 100 rad/s.

The foregoing and/or other aspects and utilities embodied in the present disclosure may be achieved by providing a method of printing using a variable data digital lithographic printing device, including applying an ink composition at a first temperature to a reimageable surface of an imaging member; and transferring the ink composition from the reimageable surface to a substrate at a second temperature, the second temperature being lower than the first temperature, wherein the ink composition does not require pre-curing before transferring the ink composition from the reimageable surface to the substrate, and wherein the ink composition includes 20% or less by weight pigment; 10% or less by weight dispersant; between 50% and 75% by weight acrylate, wherein the acrylate includes a trifunctional acrylate monomer, a tetrafunctional polyester acrylate oligomer, and an optional difunctional polyester acrylate oligomer; between 5 and 10% by weight photoinitiator, wherein the amounts are based on the total weight of the ink composition; wherein an effective amount of the trifunctional acrylate monomer in combination with the tetrafunctional polyester acrylate oligomer, and the optional difunctional polyester acrylate oligomer provides the ink composition with a near-zero shear (1 rad/s) viscosity of the ink composition is between $2\times10^6$ cP and $5\times10^7$ cP at 25° C., and between $2.\times10^5$ cP and $4.\times10^6$ cP at 60° C.; a 60 second tack of the ink composition is between 40 and 65 g-m at 25° C., and between 10 and 20 g-m at 60° C.; and an energy of activation of between 15 and 180 at kJ/mol at 1 rad/s, and between 40 and 120 at kJ/mol at 100 rad/s.

In an embodiment, of the ink composition, the acrylate includes between 2 and 20% by weight a trifunctional acrylate monomer, between 40 and 70% by weight of a tetrafunctional polyester acrylate oligomer, and between 0 and 15% by weight of a difunctional polyester acrylate oligomer, wherein the amounts are based on the total weight of the ink composition.

In another embodiment, the second temperature is between 25° C. and 60° C., the second temperature is lower than the first temperature, and the 60 second tack of the acrylate ink composition at the second temperature is about 1.3 times lower per about 7-8° C. increase from the first temperature.

In another embodiment, the second temperature is between 25° C. and 60° C., the second temperature is lower than the first temperature, and the viscosity of the acrylate ink composition at the second temperature is about 1.2 times lower per about 10° C. increase from the first temperature.

In another embodiment, the first temperature is at least 20° C. higher than the second temperature.

In another embodiment, the first temperature is at least 50° C. higher than the second temperature.

In another embodiment, the first temperature is at least 80° C. higher than the second temperature.

In another embodiment, the ink has a near-zero shear viscosity of between $2\times10^6$ cP and $5\times10^7$ cP at the second temperature ° C., and between $2\times10^5$ cP and $4\times10^6$ cP at the first temperature, and a 60 second tack of the ink composition is between 40 and 65 g-m at the second temperature, and between 10 and 20 g-m at the first temperature.

In another embodiment, the acrylate comprises at least one of an acrylate monomer, acrylate polymer, acrylate oligomer, a trifunctional acrylate monomer, a polyester acrylate, and mixtures thereof.

In another embodiment of the method, the ink composition is essentially 20% or less by weight pigment; 10% or less by weight dispersant; between 50% and 75% by weight acrylate, wherein the acrylate is a mixture of a trifunctional acrylate monomer, a tetrafunctional polyester acrylate oligomer, and an optional difunctional polyester acrylate oligomer; between 5% and 10% by weight photoinitiator; 1.5% or less by weight stabilizer, based on the total weight of the ink composition; and 12% or less by weight rheology modifier, wherein the amounts are based on the total weight of the ink composition, wherein an effective amount of the trifunctional acrylate monomer in combination with the tetrafunctional polyester acrylate oligomer, and the optional difunctional polyester acrylate oligomer provides the ink composition with a near-zero shear viscosity of between $2\times106$ cP and $5\times107$ cP at 25° C., and between $2.\times105$ cP and 4.×106 cP at 60° C., a 60 second tack of between 40 g-m and 65 g-m at 25° C., and between 10 g-m and 20 g-m at 60° C., and an energy of activation of between 15 and 180 at kJ/mol at 1 rad/s, and between 40 and 120 at kJ/mol at 100 rad/s.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which.

Figure 1:
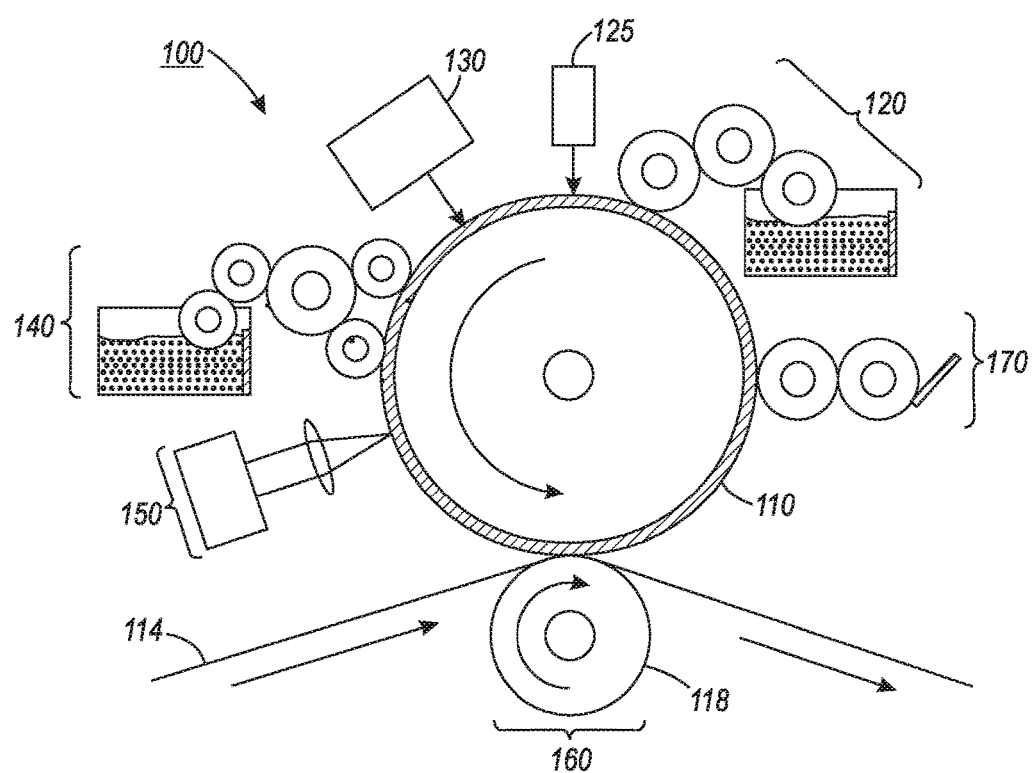
FIG. 1 illustrates a variable image digital printing system.

It should be noted that some details of the drawings have been simplified and are drawn to facilitate understanding of the present teachings rather than to maintain strict structural accuracy, detail, and scale.

The drawings above are not necessarily to scale, with emphasis instead generally being placed upon illustrating the principles in the present disclosure. Further, some features may be exaggerated to show details of particular components. These drawings/figures are intended to be explanatory and not restrictive.

DETAILED DESCRIPTION

Reference will now be made in detail to the various embodiments in the present disclosure. The embodiments are described below to provide a more complete understanding of the components, processes and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/C, A/B/C, etc. In addition, throughout the specification, the meaning of "a," "an," and "the" include plural references. The meaning of "in" includes "in" and "on."

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

As used herein, the term "near-zero shear viscosity" refers to low shear viscosity measured at an applied shear or rotational frequency of equal to or less than about 0.16 Hz or 1 rad/s.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof. For example, while the embodiments below are described in view of the printing system illustrated in FIG. 1, it should be understood that embodiments of the acrylate ink compositions described herein may also be used with other compatible printing systems.

Ink compositions in accordance with embodiments recited herein are suitable for ink-based digital printing. "Variable data lithography printing," or "ink-based digital printing," or "digital offset printing," as these terms may be used throughout this disclosure, refer to lithographic printing of variable image data for producing images on a substrate that are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system or digital offset printing system. A "variable data lithography system" is a system that is configured for lithographic printing using lithographic inks and based on digital image data, which may vary from one image to the next.

By way of example, an ink-based digital printing system with anilox roll ink delivery subsystem that may be used with embodiments of the acrylate ink compositions herein is described in U.S. patent application Ser. No. 13/095,714. U.S. patent application Ser. No. 13/095,714 ("714 Application"), titled "Variable Data Lithography System," filed on Apr. 27, 2011, by Timothy Stowe et al., which is commonly assigned, and the disclosure of which is hereby incorporated by reference herein in its entirety, describes an exemplary variable data lithography system 100 for ink-based digital printing in FIG. 1.

A general description of the exemplary printing system 100 shown in FIG. 1 is provided below. Additional details regarding individual components and/or subsystems shown in the exemplary system 100 of FIG. 1 may be found in the 714 Application.

FIG. 1 illustrates a variable image digital printing system. As illustrated in FIG. 1, a printing system 100 may include an imaging member 110. While the imaging member 110 is illustrated in FIG. 1 as a drum, in other embodiments, the imaging member 110 could also be embodied as a plate, belt, or another now known or later developed configuration. The imaging member 110 includes a reimageable surface that may be formed of materials including, for example, a class of materials commonly referred to as silicones, including polydimethylsiloxane (PDMS), among others. For example, silicone, fluorosilicone, and/or fluoroelastomer may be used to form the reimageable surface of the imaging member 110. The reimageable surface may be formed of a relatively thin layer over a mounting layer, a thickness of the relatively thin layer being selected to balance printing or marking performance, durability, and manufacturability.

In some embodiments, the imaging member 110 is used to apply an inked image to an image receiving media substrate 114 at a transfer nip 112. The transfer nip 112 may be formed by an impression roller 118, as part of an image transfer mechanism 160, exerting pressure in the direction of the imaging member 110. Image receiving medium substrate 114 should not be considered to be limited to any particular composition, such as; for example, paper, plastic, or composite sheet film. The exemplary printing system 100 may be used for producing images on a wide variety of image receiving media substrates 114. The 714 Application also explains the wide latitude of marking (printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers over a cylindrical core.

The exemplary printing system 100 may include a dampening fluid system 120 generally comprising a series of rollers, which may be considered as dampening rollers or collectively as a dampening unit, for uniformly wetting the reimageable surface of the imaging member 110 with dampening fluid. One purpose of the dampening fluid system 120 is to deliver a layer of dampening fluid, generally having a uniform and controlled thickness, to the reimageable surface of the imaging member 110. A dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Extensive experimentation has found that a preferred dampening fluid may be D4 (octamethylcyclotetrasiloxane). Other suitable dampening fluids are disclosed, by way of example, in U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110 by the dampening fluid system 120, a thickness of the dampening fluid may be measured using a sensor 125 that may provide feedback to control the metering of the dampening fluid onto the reimageable surface of the imaging member 110 by the dampening fluid system 120.

After an amount of dampening fluid is provided by the dampening fluid system 120 on the reimageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface of the imaging member 110. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a pre-cure or rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. However, in some embodiments, the cohesiveness and viscosity characteristics of the ink composition may not require pre-curing. As used herein, the cohesiveness of an ink composition is quantified by measuring tack, with higher the tack, greater the cohesiveness. For example, an acrylate ink composition may be delivered from the inker subsystem 140 to the image receiving medium 114 without partial pre-curing in-between. In some embodiments, cooling may be used to modify rheology as well via multiple physical cooling mechanisms, as well as via chemical cooling. For example, in one embodiment, the image receiving medium 114 or the impression roller 118 may be cooled.

In some embodiments, the use of an acrylate ink composition according to various embodiments described hereinbelow may enable high transfer efficiency without the use of control subsystem 150, due to rheology and/or tack characteristics of the ink composition. For example, in some embodiments, a high viscosity and high tack of the ink composition enables transfer without pre-curing.

The ink is transferred from the reimageable surface of the imaging member 110 to a substrate of image receiving medium 114 using a transfer subsystem 160. The transfer occurs as the image receiving media substrate 114 is passed through a nip 112 between the imaging member 110 and an impression roller 118 such that the ink within the voids of the reimageable surface of the imaging member 110 is brought into physical contact with the image receiving media substrate 114. With the adhesion of the ink having been modified by the rheology control system 150, or the adhesion of the ink promoted based on a composition of the ink, adhesion of the ink may cause the ink to adhere to the image receiving media substrate 114 and to separate from the reimageable surface of the imaging member 110. Careful control of the rheology of the ink through composition or other means, as well as temperature and pressure conditions at the transfer nip 112, may allow, or otherwise facilitate, transfer efficiencies for the ink from the reimageable surface of the imaging member 110 to the image receiving media substrate 114 to exceed 95%. While it is possible that in some embodiments some dampening fluid may also wet the image receiving media substrate 114, the volume of such a dampening fluid will be minimal, and will rapidly evaporate or be absorbed by the image receiving media substrate 114.

In some embodiments, a temperature difference between delivery of the ink from the inker subsystem 140 to the image member 110 and delivery to the image receiving media substrate 114 enables transfer without pre-curing.

In certain offset lithographic systems, it should be recognized that an offset roller, not shown in FIG. 1, may first receive the inked image pattern and then transfer the inked image pattern to a substrate according to a known indirect transfer method.

Following the transfer of a high percentage of the ink to the image receiving media substrate 114, residual ink and/or residual dampening fluid should be removed from the reimageable surface of the imaging member 110, preferably without scraping or wearing the reimageable surface. For example, an air knife may be employed to remove residual dampening fluid and/or ink. It is anticipated, however, that some amount of ink residue may remain on the reimageable surface. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, in some embodiments cleaning of the residual ink and dampening fluid from the reimageable surface of the imaging member 110 is needed to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may preferably be formed of a polymeric elastomer, such as silicone rubber and/or fluorosilicone rubber. The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms, while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The digital offset ink must be compatible with materials with which it is intended to come in contact, including the imaging plate (reimageable surface of the imaging member) and various dampening fluids, as well as printable substrates such as paper, metal, or plastic. The digital offset ink must also meet all functional requirements of the subsystems as imposed by wetting and transfer properties defined by subsystem architecture and materials sets.

In some embodiments, inks formulated for ink-based digital printing, or digital offset inks, are different in many ways from inks developed for other printing applications, including pigmented solvent inks, offset inks, flexography inks, UV gel inks, and the like. For example, digital offset inks contain much higher pigment loading leading to higher viscosities at room temperature than other inks, which can make ink delivery by way of an anilox roller system difficult. In some embodiments, digital offset inks should not cause the imaging member (reimageable) surface, which may be a silicone, fluorosilicone, or VITON-containing imaging plate or blanket, to swell and should be compatible with dampening fluid options.

Acrylate ink composition according to the embodiments disclosed herein have been found to minimize a solubility of the acrylate ink compositions in dampening fluid, such as D4, and to minimize or prevent swelling of a fluorosilicone-containing imaging member. Acrylate ink compositions in accordance with embodiments preferably exhibit a rheology that is suitable for anilox roller delivery. Acrylate ink compositions in accordance with some embodiments herein include digital offset acrylate inks that exhibit desirable transferability without pre-curing. In addition, some embodiments of the acrylate ink compositions are compatible with non-aqueous dampening fluids and exhibit desirable releasability from the imaging member (reimageable) surface after ink image formation.

In some embodiments, the acrylate ink compositions may include a pigment, an acrylate, a dispersant, and a photo initiator. In other embodiments, the acrylate ink compositions may also include a rheology modifier, and/or stabilizer.

For example, in one embodiment, the acrylate ink compositions may include pigments such as HELIOGEN Blue D 7088 available from BASF, Permanent Rubine L5B 01 (PR57:1), Permanent Yellow G-MX (PY 14), or HOSTAPERM Blue B4G, available from Clariant Corporation. Other suitable pigments include black pigments, white pigments, cyan pigments, magenta pigments, yellow pigments, and the like. Further, pigments may be organic or inorganic particles. Suitable inorganic pigments may include carbon black. However, other inorganic pigments may be suitable such as titanium oxide, and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigments may be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, Orion Engineered Carbons, and E.I. DuPont de Nemours and Company. Suitable carbon black pigments include, without limitation, Nipex 150 (available from Orion Engineered Carbons), Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Orion Engineered Carbons pigments, such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. In some embodiments, the pigment particle size is desired to be as small as possible to enable a stable colloidal suspension of the particles in the liquid vehicle, for example.

In one embodiment, the acrylate ink composition includes 30% or less pigment by weight, based on a total weight of the acrylate ink composition. In another embodiment, the acrylate ink composition includes 20% or less pigment. In another example, the acrylate ink composition includes between 10% and 20% pigment. In yet another example, the acrylate ink composition includes between 12% and 18% pigment. In another embodiment, the acrylate ink composition includes between 15% and 20% pigment. In another example, the acrylate ink composition includes 15% or 17.5% pigment.

In an embodiment, the ink composition is free of a fluorescent colorant and or a fluorescent pigment.

In some embodiments, the acrylate ink compositions may include an acrylate. Acrylates or propenoates are salts and esters of acrylic acid. Acrylate and methacrylate monomers are understood to contain reactive vinyl functional groups that facilitate formation of acrylate polymers. Exemplary acrylates may include acrylate monomers, oligomers, or polymers. Non limiting examples of acrylates include:

a. difunctional acrylate monomers, for example, neopentyl glycol diacrylate such as SR247, decanediol diacrylate such as CD595 and propoxylated (2) neopentyl glycol diacrylate such as SR9003, all available from Sartomer;

b. trifunctional acrylate monomers, for example, propoxylated (3) trimethylolpropane triacrylate, such as SR492, propoxylated (3) glycerol triacrylate such as SR9020, propoxylated (6) trimethylolpropane triacrylate such as CD501, ethoxylated (3) trimethylolpropane triacrylate such as SR454 and ethoxylated (15) trimethylolpropane triacrylate available as SR9035, all available from Sartomer; and c. acrylate oligomers, for example, a polyester acrylate oligomer such as CN2264; a difunctional polyester acrylate oligomer such as CN2256; a tetrafunctional polyester acrylate oligomer, such as CN294E and CN2282; a hexafunctional polyester acrylate oligomer, such as CN2295, all available from Sartomer; and a fatty acid modified hexafunctional polyester acrylate oligomer such as EBECRYL 450; a tetrafunctional polyester acrylate oligomer such as EBECRYL 657, and a modified polyester acrylate oligomer such as EBECRYL 809, all available from Allnex.

In an embodiment, the acrylate present in the ink composition comprises a trifunctional acrylate monomer and an acrylate oligomer comprising a tetrafunctional polyester acrylate oligomer and an optional difunctional polyester acrylate oligomer. In another embodiment, the acrylate may further comprise one or more of an aliphatic acrylate ester and a polyethylene glycol diacrylate. In another embodiment, the acrylate present in the ink composition is substantially free of one or more of an aliphatic acrylate ester and a polyethylene glycol diacrylate and primarily includes a trifunctional acrylate monomer, a tetrafunctional polyester acrylate oligomer and an optional difunctional polyester acrylate oligomer. In one embodiment, the acrylate ink composition includes between 40% and 80% acrylate by weight, based on a total weight of the acrylate ink composition. In another embodiment, the acrylate ink composition includes between 50% and 75% by weight acrylate, based on the total amount of the ink composition. In yet another example, the acrylate ink composition includes between 60% and 75% by weight acrylate. In one example, the acrylate ink composition includes between 62% and 72% acrylate.

The trifunctional acrylate monomer may be present in an amount of from 1 to about 20 wt %, or from 1 to about 18 wt %, or from 1 to about 15 wt %, based on the total amount of the ink composition. The total amount of acrylate oligomer may be present in an amount of from 40 to about 70 wt %, or from about 45 to about 70 wt % or from about 55 to about 70 wt %, based on the total amount of the ink composition. The tetrafunctional polyester acrylate oligomer may be present in an amount of from about 40 to about 70 wt %, or from about 45 to about 70 wt % or from about 57 to about 70 wt %, based on the total amount of the ink composition. The difunctional polyester acrylate oligomer may be present in an amount of from 0 to about 15 wt %, or from about 2 to about 12 wt % or from about 4 to about 10 wt %, based on the total amount of the ink composition.

In some embodiments, the acrylate ink compositions may include a dispersant. The dispersants may include polymeric dispersants, such as those from Lubrizol including SOLSPERSE 32000, SOLSPERSE 39000, SOLSPERSE 71000, SOLSPERSE 78000, SOLSPERSE J-100, SOLSPERSE J-180, SOLSPERSE J-200, SOLSPERSE X300, and from BASF, such as EFKA 4300, EFKA 4330, EFKA 4340, EFKA 4400, EFKA PX 4701, EFKA 4585, EFKA 5207, EFKA 6230, EFKA 7701, EFKA 7731, and from Tego, such as TEGO Dispers 656, TEGO Dispers 685, TEGO Dispers 710, and from King Industries, such as K-SPERSE A-504.

In one embodiment, the acrylate ink composition includes 10% or less dispersant by weight, based on a total weight of the acrylate ink composition. In another example, the acrylate ink composition includes between 2% and 10% dispersant. In yet another example, the acrylate ink composition includes between 4% and 8% dispersant.

In some embodiments, the acrylate ink compositions may include rheology modifiers. Exemplary rheology modifiers may be modified or unmodified inorganic compounds including organoclays, attapulgite clays and bentonite clays, including tetraallkyl ammonium bentonites as well as treated and untreated synthetic silicas. Suitable organoclays include from Southern Clay Products CLAYTONE HA and CLAYTONE HY. Suitable examples of tetraallkyl ammonium bentonites include from Celeritas Chemicals CELCHEM 31743-09, CELCHEM 31744-09, and CELCHEM 31745-09. Other exemplary rheology modifiers include organic compounds such as EFKA RM1900 and EFKA RM1920, both modified hydrogenated castor oils from BASF.

In one embodiment, the acrylate ink composition includes 12% or less rheology modifiers by weight, based on a total weight of the acrylate ink composition. In another example, the acrylate ink composition includes between 1% and 5% rheology modifiers. In yet another example, the acrylate ink composition includes 3% or less rheology modifiers. In one embodiment, the acrylate ink composition includes 2% rheology modifiers.

In an embodiment, the ink composition is free of a tack-modifier, which can be a tack-enhancer or a tack-reducer. Exemplary tack modifiers that the ink composition of the present disclosure is free of, include but are not limited to, silicone free acrylics such as Modaflow® 9200 and Modaflow® 2100, available from Allnex Belgium SA/NV; JA21080 Polymatrix UV Gel Tack Reducer, and JA21090 Polymatrix UV Liquid Tack Reducer, available from Joules Angstrom UV Printing Inks Corp; functional polyester urethane acrylates such as Bomar™ BR-471, BR-741, and BR-7432 GB, functional polyester urethane methacrylates such as Bomar™ BR-742M, functional polyether urethane acrylates such as Bomar™ BR-571 and BR-582, functional polyether urethane methacrylates such as Bomar™ BR-571 MB, and an acrylamidomethyl-susbtituted cellulose ester polymer such as Jaylink® 106E, all available from available from Dymax Corporation; a modified special polyester such as TEGO® Addbond LTH, available from Evonik Industries; a phthalate ester of technical hydroabietyl alcohol such as Cellolyn® 21-E, a fully hydrogenated resin such as Foral® AX-E, and an ester of a hydrogenated resin such as Foral® 85-E, both available from Eastman Chemicals; and combinations of these and other additives.

In some embodiments, the acrylate ink compositions may include photoinitiators. Photoinitiators may be liquid- or solid-based or combinations thereof. Suitable Type I photoinitiators include those from classes of dialkoxy-acetopheonones, dialkoxy-alkyl-pheonones, amino-alkyl-pheonones, and acyl-phosphine oxides. Suitable Type II photoinitiators include those from classes of benzophenones and thioxanthones, which require activation from suitable amine synergists. Exemplary photoinitiators include ADDITOL LX, ADDITOL DX, ADDITOL BDK, ADDITOL CPK, ADDITOL DMMTA, ADDITOL TPO from Allnex, Esacure 1001M from IRGACURE 127, IRGACURE 184, IRGACURE 379, IRGACURE 819 and IRGACURE 2959 from BASF. Exemplary amine synergists that are used with Type II photoinitiators include SPEEDCURE PDA, SPEEDCURE EDB from Lambson, Diethylaminoethyl Methacrylate, Ethyl-4-dimethylamino benzoate, 2-Ethylhexyl 4-dimethylamino benzoate from Esstech, Inc. In some embodiment, the acrylate ink composition may include low odor photoinitiators, such as, ESACURE KIP 150 available from Lamberti S.p.A.

In one embodiment, the acrylate ink composition includes 12% or less photoinitiators by weight, based on a total weight of the acrylate ink composition. In another example, the acrylate ink composition includes 10% or less photoinitiators. In yet another example, the acrylate ink composition includes between 5% and 10% photoinitiators. In one embodiment, the acrylate ink composition includes between 6% and 8% by weight photoinitiators.

In some embodiments, the acrylate ink compositions may stabilizers. In some embodiments, the stabilizers may be embodied as a free radical polymerization inhibitor or a free radical scavenger. In some embodiments, the stabilizer offers stability against pre-mature partial polymerization of the acrylate ink composition. For example, the stabilizers may include Sartomer USA CN3216 (an active component proprietary stabilizer with p-methoxyphenol in a proprietary acrylate monomer and a proprietary acrylate oligomer), BASF IRGASTAB UV22 (a hindered phenol), and GENORAD 16 and GENORAD 18, both from Rahn USA Corporation.

In one embodiment, the acrylate ink composition includes 1.5% or less active component stabilizers by weight, based on a total weight of the acrylate ink composition. In another example, the acrylate ink composition includes 0.4% or less stabilizers. In another example, the acrylate ink composition includes between 0.1 and 0.3% stabilizers. In one embodiment, the acrylate ink composition includes 0.2% stabilizers.

Acrylate ink compositions in accordance with the embodiments described herein may be formed by preparing an ink base and mixing it with one or more of the components recited above.

The acrylate ink compositions, as disclosed hereinabove, comprising less than 20% by weight of a pigment, 10% or less by weight of a dispersant, 57 and 70% by weight of an acrylate and 5 to 10% by weight of a photoinitiator, based on the total amount of the ink composition. The acrylate present in the acrylate ink composition of the present disclosure comprises 1 to 20% by weight a trifunctional acrylate monomer, 57 to 70% by weight of a tetrafunctional polyester acrylate oligomer and 0 to 15% by weight of a difunctional polyester acrylate oligomer. It has been found that the combination of a trifunctional acrylate monomer, a tetrafunctional polyester acrylate oligomer, and optionally a difunctional polyester acrylate oligomer, present in the ink composition of the present disclosure, causes the ink compositions to have a high viscosity and high tack at or near room temperature and a lower viscosity and high tack at elevated temperatures of about 40 to about 70° C.

As used herein, the high viscosity and high tack at or near room temperature refers to an ink composition having viscosity of greater than $2\times10^6$ and 60 second tack of greater than 40 g-m measured at 25° C. and a viscosity of greater than $2\times10^5$ and a 60 second tack of greater than 15 g-m measured at 60° C.

Accordingly, the acrylate ink compositions of the present disclosure have a lower viscosity at elevated temperatures, such as about 40° C., about 50° C., and about 60° C., to enable better fill-in of the ink composition in the Anilox delivery roller and ink delivery and wetting onto the imaging blanket, while simultaneously displaying a high tack at these elevated temperatures to maintain adequate ink cohesion for effective and consistent and successful transfer of the ink composition from the Anilox roller to the imaging plate, resulting in a higher and more uniform optical densities of the imaged ink on the printing substrate.

In one embodiment, the high viscosity and high tack state enables transfer of the acrylate ink composition without the use of pre-cure step.

In some embodiments, the acrylate ink composition has a 60 second tack of between 40-65 g-m at 25° C.; between 30-50 g-m at 32° C.; between 25-35 g-m at 40° C.; between 15-30 g-m at 50° C.; and between 14-25 g-m at 60° C.

In one embodiment, the acrylate ink composition has a 60 second tack of between 40-60 g-m at 25° C.; between 35-50 g-m at 32° C.; between 25-30 g-m at 40° C.; between 20-25 g-m at 50° C.; and between 15-24 g-m at 60° C.

In one embodiment, the acrylate ink composition has a tack between 20-35 g-m, at elevated temperatures of about 40° C. to about 70° C.

In some embodiments, the acrylate ink composition has a near-zero shear viscosity, measured at 1 rad/sec, of between $2\times10^6$ and $5\times10^7$ cps at 25° C. and between $2\times10^5$ to $4\times10^6$ cps at 60° C.

In one embodiment, the acrylate ink composition has a near-zero shear viscosity, measured at 1 rad/sec, of between $4\times10^6$ and $1\times10^7$ cps at 25° C. and between $4\times10^5$ to $8\times10^5$ cps at 60° C.

In one embodiment, when the ink composition is part of a set of ink compositions, each ink composition may have a minimum differential tack to allow full transfer of the ink composition to the substrate, with first ink to be printed having a greater tack than the second ink that will be printed on the first ink, and so on. For example, in one embodiment, each ink composition may have a tack differential of between 2 and 5 g-m.

In an embodiment, the ink compositions, as disclosed hereinabove, also have a preferred range of energy of activation at specific frequencies that correlates the viscosity sensitivity to temperature property of the ink compositions. For example, in some embodiments, if the energy of activation is too high, the ink composition will not flow well, and if the energy of activation is too low, the ink composition will be too fluid. In some embodiments, the ability of an ink composition to transfer at a higher temperature to an Anilox roller and then to set upon an imaging plate can be predicted from their energy of activation at specific frequencies.

In one embodiment, the acrylate ink compositions, as disclosed hereinabove, have an energy of activation of between 40 and 120 kJ/mol at 100 rad/s and between 15 and 180 at 1 rad/s. In one embodiment, the acrylate ink compositions have an energy of activation of between 50 and 110 kJ/mol at 100 rad/s and between 20 and 150 at 1 rad/s. In yet another embodiment, the acrylate ink compositions have an energy of activation of between 55 and 80 kJ/mol at 100 rad/s and between 25 and 100 at 1 rad/s.

It should be noted that although it is possible to design inks to have a certain rheology at one temperature but outside of the preferred range of energies of activation for viscous flow; such inks are not desired and are out of the scope of the present disclosure.

In some embodiments, there is a method of printing using a variable data digital lithographic printing devices, where the acrylate ink compositions of the present disclosure with a higher tack are beneficial for increased ink transfer and image quality.

The method includes applying the acrylate ink composition, as disclosed hereinabove to a reimageable surface of an imaging member at a first temperature; and transferring the acrylate ink composition from the reimageable surface to a substrate at a second temperature. In some embodiment, the temperature difference between the first temperature and the second temperature is at least 20° C. In other embodiments, the temperature difference between the first temperature and the second temperature is at least 30° C. In another embodiment, the temperature difference between the first temperature and the second temperature is at least 40° C. In another embodiment, the temperature difference between the first temperature and the second temperature is at least 50° C. In another embodiment, the temperature difference between the first temperature and the second temperature is at least 60° C. In another embodiment, the temperature difference between the first temperature and the second temperature is at least 70° C. In another embodiment, the temperature difference between the first temperature and the second temperature is at least 80° C. In some embodiments, the temperature difference between the first temperature and the second temperature is between 20° C. and 80° C.

In one embodiment, the first and second temperatures are in the range of 25° C. to 60° C., the second temperature is lower than the first temperature, and a 60 second tack of the acrylate ink composition is about 1.3 times lower (+/−~0.1) per 7 to 8° C. increase in temperature from the first temperature. In another embodiment, the first and second temperatures are in the range of 25° C. to 60° C., the second temperature is lower than the first temperature, and a near-zero shear viscosity of the acrylate ink composition is about 1.2 times lower (+/−~0.1) per 10° C. increase in temperature from the first temperature. The higher tack and lower rheology of acrylate ink compositions at certain temperatures allow efficient transfer of images from the imaging plate to a substrate without a pre-cure option.

In some embodiments, acrylate ink compositions in accordance with the embodiments of this disclosure are compatible with dampening fluids and imaging member or reimageable surface/plate materials of ink-based digital printing systems. For example, embodiments of the acrylate ink compositions may be immiscible in dampening fluids, such as D4, and provide low background in non-imaging areas.

Extensive experimentation has revealed various advantages that the acrylate ink compositions according to embodiments of this disclosure may provide enhanced ease of delivery to an imaging member, such as a reimageable offset plate, efficient inking and transfer of ink without the requirement of a pre-cure step, uniformity of inking on the reimageable surface due to reduced rheology, high resolution images due to increased rheology realized on blanket, enhanced transfer efficiency from the reimageable surface to a variety of substrate due to high tack (internal cohesion) of the ink, and enhanced print quality on a variety of substrates. Furthermore, the ink compositions of the present disclosure provide for optional cooling of the blanket and/or receiving substrate, such as paper to realize the benefits of even a larger temperature differential which would lead to higher ink tack and rheology if so desired or required. Also, these ink compositions do not tend to degrade printing system components, such as reimageable surfaces of imaging members, with which they contact. These acrylate ink compositions also meet various sub-system requirements imposed by ink-based digital printing systems that are configured for variable data lithographic printing. These requirements include wettability, releasability from a reimageable surface of an imaging member, and compatibility with non-aqueous dampening fluids configured for use with ink-based digital printing methods and systems.

Acrylate ink compositions are provided herein that meet the foregoing requirements. The disclosed acrylate ink compositions may be effectively delivered from an anilox roller-type delivery system to a reimageable surface of an imaging member during a variable data offset printing operation in which images on the reimageable surface are changeable between cycles of the imaging member. The disclosed acrylate ink compositions exhibit stable rheology and tack that enables delivery using an anilox roll delivery system, and demonstrate desirable transferability to a reimageable surface of an imaging member.

Furthermore, the acrylate ink compositions as disclosed hereinabove comprising a trifunctional acrylate monomer in combination with a tetrafunctional polyester acrylate oligomer, and optionally a difunctional polyester acrylate oligomer, provide another potential advantage of a higher cross-linking density of the printed ink image upon being cured, as compared to ink compositions comprising higher viscosity acrylate oligomers and monomers which are free of the trifunctional acrylate monomer. While intending to be not bound by any theory, it is believed that the trifunctional acrylate monomer having relatively low viscosity is labile in the printed ink's cross-linking matrix during the irradiation and curing process, and thereby offers better curing conversion rate over inks containing higher viscosity acrylate oligomers and monomers with no trifunctional acrylate monomer. A trifunctional acrylate monomer also has the ability to enable a higher degree of conversion more readily than a difunctional acrylate monomer owing to the extra functionality of the trifunctional acrylate monomer and thus provides a potentially higher cross-linking density of the printed ink image upon being cured.

In an aspect, there is a method of preparing an ink composition, as disclosed hereinabove. The method including preparing an ink base by mixing the following components: a stabilizer, a dispersant, and an acrylate comprising a trifunctional acrylate monomer, a tetrafunctional polyester acrylate oligomer, and an optional difunctional polyester acrylate oligomer. The mixing of the components can be done at any suitable temperature such as 80° C. with stirring. The method further comprises adding a photoinitiator slowly to the ink base, followed by the addition of a pigment to the ink base to form a pigmented ink base. The method also includes optionally adding a rheology modifier to the pigmented ink base. The method can further include shear milling the pigmented ink base followed by roll milling such as by using a 3-roll mill apparatus.

Aspects of the present disclosure may be further understood by referring to the following examples. The examples are illustrative, and are not intended to be limiting embodiments thereof. Examples 1-4 illustrate embodiments of acrylate ink compositions according to the disclosure.

EXAMPLES

Example 1

Based on a total 400 gram scale of preparation for a cyan ink composition, 4.5% wt. of a polymeric dispersant SOLSPERSE 39000, 65% wt. of a tetrafunctional polyester acrylate oligomer—CN294E (CN294E is a clear liquid having a specific gravity of 0.93 and a viscosity of 4,000 cps at 60° C.), 5.49% of a propoxylated (6) trimethylolpropane triacrylate monomer—CD501 (CD501 is a clear liquid having a specific gravity of 1.048 and a viscosity of 125 cps at 25° C.), and 1% wt. of a stabilizer CN3216 were added to a 1 liter stainless steel vessel and placed on a heating mantle (available from IKA®) together with a thermocouple and stirrer apparatus (also available from IKA®) and equipped with an anchor impeller. The components in the vessel (dispersant, acrylates, and stabilizer) were then stirred at 200 RPM for 30 minutes at 80° C. Thereafter photoinitiators (2% wt. Irgacure 379, 0.39% wt. Irgacure 819, 1% wt. Irgacure 184, and 3.62% wt. Esacure Kip 150) were added slowly to the vessel and stirred at about 80° C. for another hour. With the components in the vessel solubilized, 15% wt. of Heliogen Blue D 7088 pigment was added to the vessel and stirred more vigorously but not to the point where air was entrained into the mixture. The pigmented mixture was allowed to stir for about 30 minutes at about 400 RPM at which point 2% wt. of a rheology modifier Claytone HY was added slowly to the pigmented mixture at a reduced RPM and then re-stirred for about another 15 minutes at about 400 RPM. The vessel containing the mixed components was then transferred to a high speed shearing mill (available from the Hockmeyer Equipment Corporation) equipped with a 40 mm diameter high shear Cowles blade and stirred at 5300 RPM for about an hour to form COMPONENT MIXTURE 1A. COMPONENT MIXTURE 1A was then qualitatively transferred to a 3-roll mill apparatus (manufactured by Kent Machine Works) where COMPONENT MIXTURE 1A was passed through the 3-roll mill first at an input apron roll speed of 400 RPM for a first pass and then at an input apron roll speed of 200 RPM for a second pass to form COMPONENT MIXTURE 1B forming the Example 1 acrylate ink composition.

Example 2

An acrylate ink composition was prepared in the same manner as Example 1 except using a magenta pigment for the pigment and adding 8.81% wt. of another acrylate oligomer, a difunctional polyester acrylate—CN2256 and the components percentages detailed in Table 1.

Example 3

An acrylate ink composition was prepared in the same manner as Example 1 except using a yellow pigment for the pigment and adding 4.5% wt. of another acrylate oligomer, a difunctional polyester acrylate oligomer—CN2256 (CN2256 has a refractive index of 1.5062, a Tg of −22° C., a tensile strength of 675 psi, and a viscosity of 11,000 cps at 60° C.) and the components percentages detailed in Table 1.

Example 4

An acrylate ink composition was prepared in the same manner as Example 1 using a different cyan pigment and the components percentages detailed in Table 1.

Table 1 summarizes the component and percentages of the acrylate ink compositions in Examples 1-4.

Comparative Example A-C

If time's Example Ink formulations—C6, C9A and C9B from Table 3A & 3B of US Application #2013/0305946 were prepared as follows:

The dispersant, monomer, oligomers and thermal stabilizer were added to a 1 liter stainless steel vessel and placed on a heating mantle (available from IKA®) together with a thermocouple and stirrer apparatus (also available from IKA®) and equipped with an anchor impeller. The components in the vessel (dispersant, acrylates, and stabilizer) were then stirred at 200 RPM for 30 minutes at 80° C. Thereafter the photoinitiators were added slowly to the vessel and stirred at about 80° C. for another hour. With the components in the vessel solubilized, the pigment was added to the vessel and stirred more vigorously but not to the point where air was entrained into the mixture. The pigmented mixture was allowed to stir for about 30 minutes at about 400 RPM at which point the rheology modifier was added slowly to the pigmented mixture at a reduced RPM and then re-stirred for about another 15 minutes at about 400 RPM. The vessel containing the mixed components was then transferred to a high speed shearing mill (available from the Hockmeyer Equipment Corporation) equipped with a 40 mm diameter high shear Cowles blade and stirred at 5300 RPM for about an hour to form the first mixture. The first mixture was then qualitatively transferred to a 3-roll mill apparatus (manufactured by Kent Machine Works) where it was passed through the 3-roll mill first at an input apron roll speed of 400 RPM for a first pass and then at an input apron roll speed of 200 RPM for a second pass to form the final ink whereupon it was discharged into glass amber bottles. The components percentages of the comparative in compositions are detailed in Table 1

It should be noted that although the total amount of acrylate present in the Comparative Examples A-C is within the range of Examples 1-4, the compositions are quite different in that the Comparative Examples A-C do not have any trifunctional acrylate monomer, such as the low viscosity monomer, CD501-propoxylated (6) trimethylolpropane triacrylate, present in the Examples 1-4.

TABLE 1

Formulation of Example Inks

| | | Comparative Examples (Example Ink Compositions from Table 3A & 3B of US 2012/0305946) (weight %) | | | Example Ink Compositions from Table 1 of the Present Application # 14/610437 (weight %) | | | |
|---|---|---|---|---|---|---|---|---|
| | Components | A (C6) | B (C9B) | C (C9A) | 1 | 2 | 3 | 4 |
| Pigment | Ciba Irgalite Blue GOL | 24.0 | 17.0 | 17.0 | — | — | — | — |
| | HELIGOEN Blue D 7088, | — | — | — | 15.0 | — | — | — |
| | Permanent Rubine L5B 01 (PR57:1), | — | — | — | — | 15.0 | — | — |
| | Permanent Yellow G-MX (PY 14), | — | — | — | — | — | 17.5 | — |
| | HOSTAPERM Blue B4G | — | — | — | — | — | — | 17.5 |
| Oligomer | Sartomer CN294E, tetrafunctional polyester acrylate | 51.3 | 49.8 | 54.08 | 65.0 | 48.91 | 57.41 | 61.73 |
| | Sartomer CN309, aliphatic acrylate ester | 10.5 | 10.2 | 11.08 | — | — | — | — |
| | CN2256, difunctional polyester acrylate | — | — | — | — | 8.81 | 4.5 | — |
| Monomer | Sartomer SR259, PEG (200) diacrylate | 0.00 | 9.75 | 10.59 | — | — | — | — |
| | CD501, propoxylated (6) trimethylolpropane triacrylate | — | — | — | 5.49 | 11.27 | 5.8 | 1.76 |
| | Total Acrylate | 61.80 | 69.75 | 75.75 | 70.49 | 68.99 | 67.71 | 63.49 |
| Dispersant | Solsperse 39000 | 6.00 | 4.25 | 4.25 | 4.5 | — | — | 7.0 |
| | Solsperse J-180 | — | — | — | — | 6.0 | 4.8 | — |
| Rheology Modifier | Southern Clay HY | 2.00 | 1.80 | 1.80 | 2.0 | 2.0 | 2.0 | 4.0 |
| Photoinitiator | Irgacure 184 | 3.50 | 3.50 | 0.00 | 1.0 | 1.0 | 1.0 | 1.0 |
| | Irgacure 819 | 2.50 | 2.50 | 0.00 | 0.39 | 0.39 | 0.39 | 0.39 |
| | Ciba Irgastab UV10 | 0.20 | 0.20 | 0.20 | — | — | — | — |
| | BYK 3500 | 0.00 | 1.00 | 1.00 | — | — | — | — |
| | Esacure KIP 150 | — | — | — | 3.62 | 3.62 | 3.6 | 3.62 |
| | Irgacure 379 | — | — | — | 2.0 | 2.0 | 2.0 | 2.0 |

TABLE 1-continued

Formulation of Example Inks

| | | Comparative Examples (Example Ink Compositions from Table 3A & 3B of US 2012/0305946) (weight %) | | | Example Ink Compositions from Table 1 of the Present Application # 14/610437 (weight %) | | | |
|---|---|---|---|---|---|---|---|---|
| Components | | A (C6) | B (C9B) | C (C9A) | 1 | 2 | 3 | 4 |
| Stabilizer | CN3216 | — | — | — | 1.0 | 1.0 | 1.0 | 1.0 |
| | Viscosity (5 Hz) (Viscosities of Ex 1-4 were interpolated from FIG. 2 of the present application) | 141,900 | 32,505 | 32,505 | 3.42E+05 | 7.79E+05 | 5.26E+05 | 3.63E+05 |

The ink composition of Examples 1-4 were analyzed in terms of rheology and tack. In particular, the frequency-based sweep rheologies, between applied 0.1 and 100 rad/s frequencies, of all inks were determined on a RFS-3 rheometer (available from TA Instruments) at 25° C., 35° C., and 45° C. equipped with a 25 mm plate at a 0.5 mm gap. The rheology results of the inks can be found in Table 2 below.

to determine the energy of activation for viscous flow, based on the Arrhenius model as:

$$\eta = A \cdot \exp(E_{(\eta)}/RT) \quad (1)$$

where $E_{(\eta)}$ is the energy of activation for viscous flow (KJ/mol), $\eta$ is the viscosity at a given steady shear rate or dynamic frequency, A is a constant, R is the Universal Gas Constant (0.0083145 KJ/mol·K) and T is the absolute temperature (K).

TABLE 2

Rheology Results (Complex Viscosities in cP)

| Complex Viscosity Frequency | Example 1 complex viscosity (cP) | | | Example 2 complex viscosity (cP) | | |
|---|---|---|---|---|---|---|
| (rad/s) | 25° C. | 35° C. | 45° C. | 25° C. | 35° C. | 45° C. |
| 1.00 | 1.04E+06 | 9.87E+05 | 6.34E+05 | — | 5.58E+05 | 5.91E+04 |
| 2.51 | 7.31E+05 | 5.76E+05 | 3.50E+05 | — | 3.65E+05 | 4.79E+04 |
| 6.31 | 5.38E+05 | 3.54E+05 | 2.06E+05 | — | 2.50E+05 | 4.05E+04 |
| 10.00 | 4.70E+05 | 2.88E+05 | 1.61E+05 | — | 2.12E+05 | 3.74E+04 |
| 25.12 | 3.63E+05 | 1.91E+05 | 1.02E+05 | — | 1.55E+05 | 3.15E+04 |
| 100.00 | 2.24E+05 | 1.02E+05 | 5.05E+04 | — | 9.06E+04 | 2.22E+04 |

| Complex Viscosity Frequency | Example 3 complex viscosity (cP) | | | Example 4 complex viscosity (cP) | | |
|---|---|---|---|---|---|---|
| (rad/s) | 25° C. | 35° C. | 45° C. | 25° C. | 35° C. | 45° C. |
| 1.00 | 2.03E+06 | 2.10E+06 | 1.64E+06 | — | 1.10E+06 | 6.12E+05 |
| 2.51 | 1.28E+06 | 1.08E+06 | 7.80E+05 | — | 6.38E+05 | 3.34E+05 |
| 6.31 | 8.85E+05 | 6.05E+05 | 3.91E+05 | — | 3.92E+05 | 1.92E+05 |
| 10.00 | 7.55E+05 | 4.69E+05 | 2.85E+05 | — | 3.16E+05 | 1.49E+05 |
| 25.12 | 5.62E+05 | 2.94E+05 | 1.58E+05 | — | 2.10E+05 | 9.22E+04 |
| 100.00 | 3.20E+05 | 1.45E+05 | 6.85E+04 | — | 1.10E+05 | 4.53E+04 |

| Complex Viscosity Frequency | Comparative Example A complex viscosity (CP) | | Comparative Example B complex viscosity (CP) | | Comparative Example C complex viscosity (CP) | |
|---|---|---|---|---|---|---|
| (rad/s) | 25° C. | 60° C. | 25° C. | 60° C. | 25° C. | 60° C. |
| 1.00 | 3.97E+05 | 2.69E+05 | 9.64E+04 | 8.03E+04 | 1.03E+05 | 8.42E+04 |
| 5.00 | 1.86E+05 | 7.64E+04 | 4.65E+04 | 2.81E+04 | 4.78E+04 | 2.82E+04 |
| 50.00 | 8.31E+04 | 1.57E+04 | 2.32E+04 | 6.27E+03 | 2.33E+04 | 6.04E+03 |
| 100.00 | 4.57E+04 | 1.08E+04 | 1.99E+04 | 4.46E+03 | 2.00E+04 | 4.24E+03 |

Figure 2:
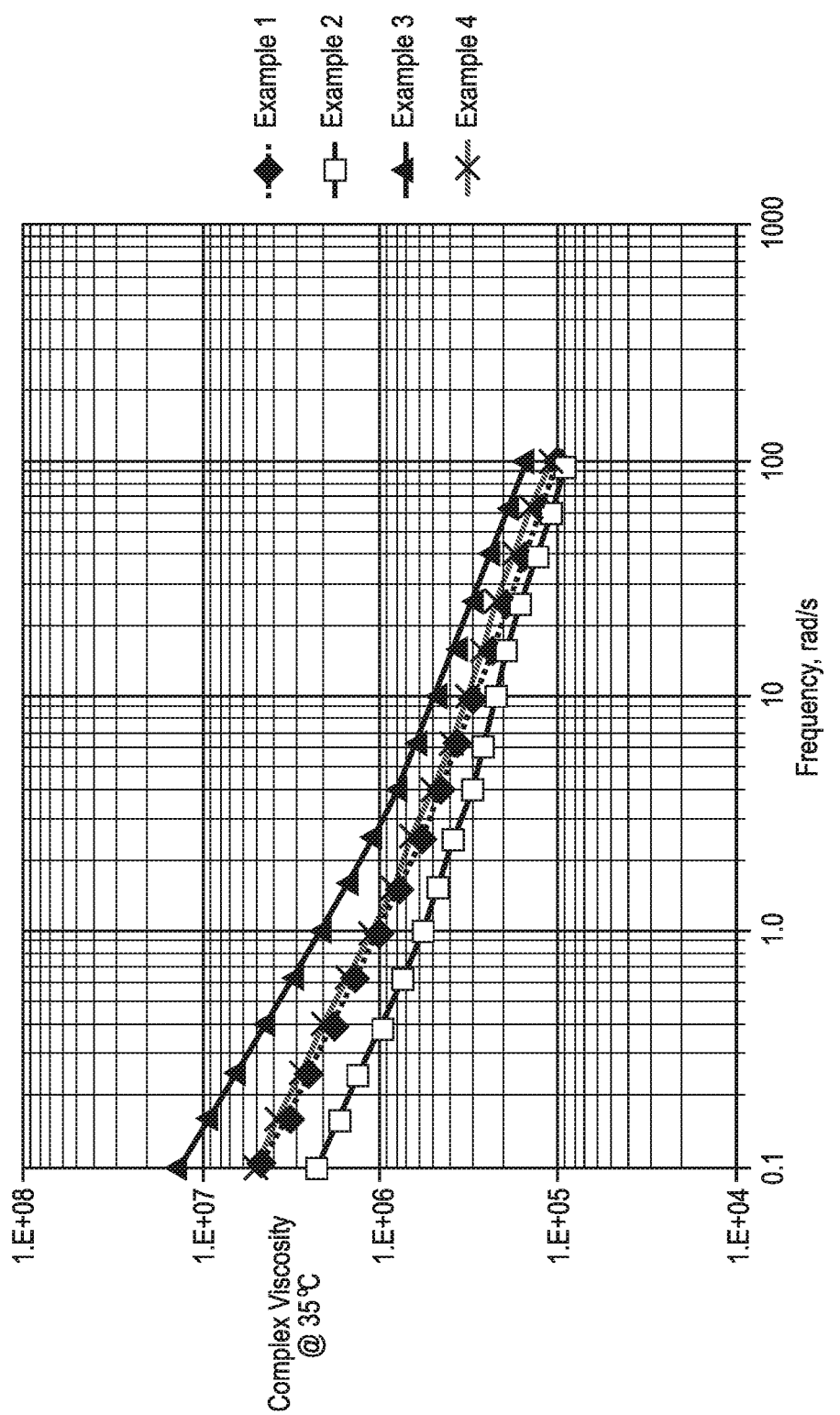
FIG. 2 illustrates frequency-based rheograms of acrylate ink compositions.

FIG. 2 illustrates the frequency-based rheograms of the ink compositions of Examples 1-4 at 35° C. As illustrated in FIG. 2, the complex viscosity of the ink compositions is within 80,000 cP and 170,000 cP at 35° C.

The rheology of the various acrylate ink compositions shown in Table 1 is illustrated in Table 2, and can be used The equation (1) can be rewritten in the form:

$$\ln(\eta) = \ln(A) + \frac{E(\eta)}{R} \cdot \frac{1}{T} \quad (2)$$

Thus, the energy of activation for viscous flow for the various acrylate ink compositions of Table 1, were calculated by determining the slope of an Arrhenius plot of the natural logarithm of complex viscosity $\ln_{(\eta)}$ (for the selected frequencies shown in Table 2) and the reciprocal absolute temperature 1/T in Kelvins.

The calculated energy of activation for viscous flow for the various acrylate ink compositions of Table 1 is presented in Table 3 in terms of KJ/mol. It should be noted that the units of KJ/mol are typically used for materials including solvents, co-solvents, single component crystalline or amorphous materials. The units KJ/mol for heterogeneous systems such as the acrylate ink compositions of Table 3 can be thought of as the normalized energy of activation for viscous flow of a given ink composition formulated within a certain compositional boundary.

TABLE 3

Energies of Activation for Viscous Flow

| Complex Viscosity measured at Frequency (rad/s) | Energy of Activation (KJ/mol) | | | | | | |
|---|---|---|---|---|---|---|---|
| | Example | | | | Comparative Example | | |
| | 1 | 2 | 3 | 4 | A | B | C |
| 100 rad/s | 58.7 | 107.3 | 60.8 | 67.6 | 34.0 | 35.3 | 36.5 |
| 1 rad/s | 18.5 | 183.1 | 20.3 | 47.7 | 9.2 | 4.3 | 4.8 |

Table 3 shows that the energy of activation for viscous flows of the Comparative Examples A-C at a dynamic frequency of 100 rad/s were on average of about 35 KJ/mol. In contrast to the Comparative Examples, the Example inks 1-4 showed much higher energies of activation for viscous flows ranging from about 60 to about 110 KJ/mol. This result was unexpected and surprising in view of other acrylate ink compositions. It should be noted from Table 1, that the ink composition of Comparative Example A had the largest amount of pigment present among all ink compositions (Examples 1-4 and Comparative Examples A-C) tested here, 24 wt % of a cyan pigment, and Comparative Example A was the only ink composition having no diluting acrylate monomer. Hence, due to the presence of large amount of pigment and the absence of diluting monomer, the Comparative Example A showed viscosities measured at various frequencies closer to the viscosities of the Examples 1-4 than Comparative Examples B and C. Therefore, one would have expected energy of activation of Comparative Example A to be also closer to that of the Examples 1-4, but data in Table 3 shows otherwise. This clearly demonstrates that an effective amount of the trifunctional acrylate monomer in combination with the tetrafunctional polyester acrylate oligomer, and the optional difunctional polyester acrylate oligomer provides the Example acrylate ink compositions 1-4 with desired properties, such as higher than expected energy of activation for viscous flows relative to the Comparative Example ink compositions A-C, and therefore making the Example ink compositions 1-4 much less fluid, which is preferred, as it aids in the stability of the inks as they are being stored and handled in a normal fashion prior to being used in a printer, such as a digital printer.

Similarly, each of the ink compositions in Examples 1-4 and Comparative Examples A-C was tested on an Inkometer 1100 (available from Thwing-Albert Company) to determine tack. The UV ink-rated rollers on the Inkometer were equilibrated at 32.2° C. In each case, 1.3 mL of the ink composition was applied to the distribution roller where transfer and distribution on to the other rollers was allowed to continue for 15 seconds at 150 RPM upon which time the speed of the rollers was automatically increased to 1200 RPM. Tack measurements of the ink occurred every 20 seconds for 10 minutes, the 60 second tack results can be found in FIG. 3 in terms of grams-meters.

Figure 3:
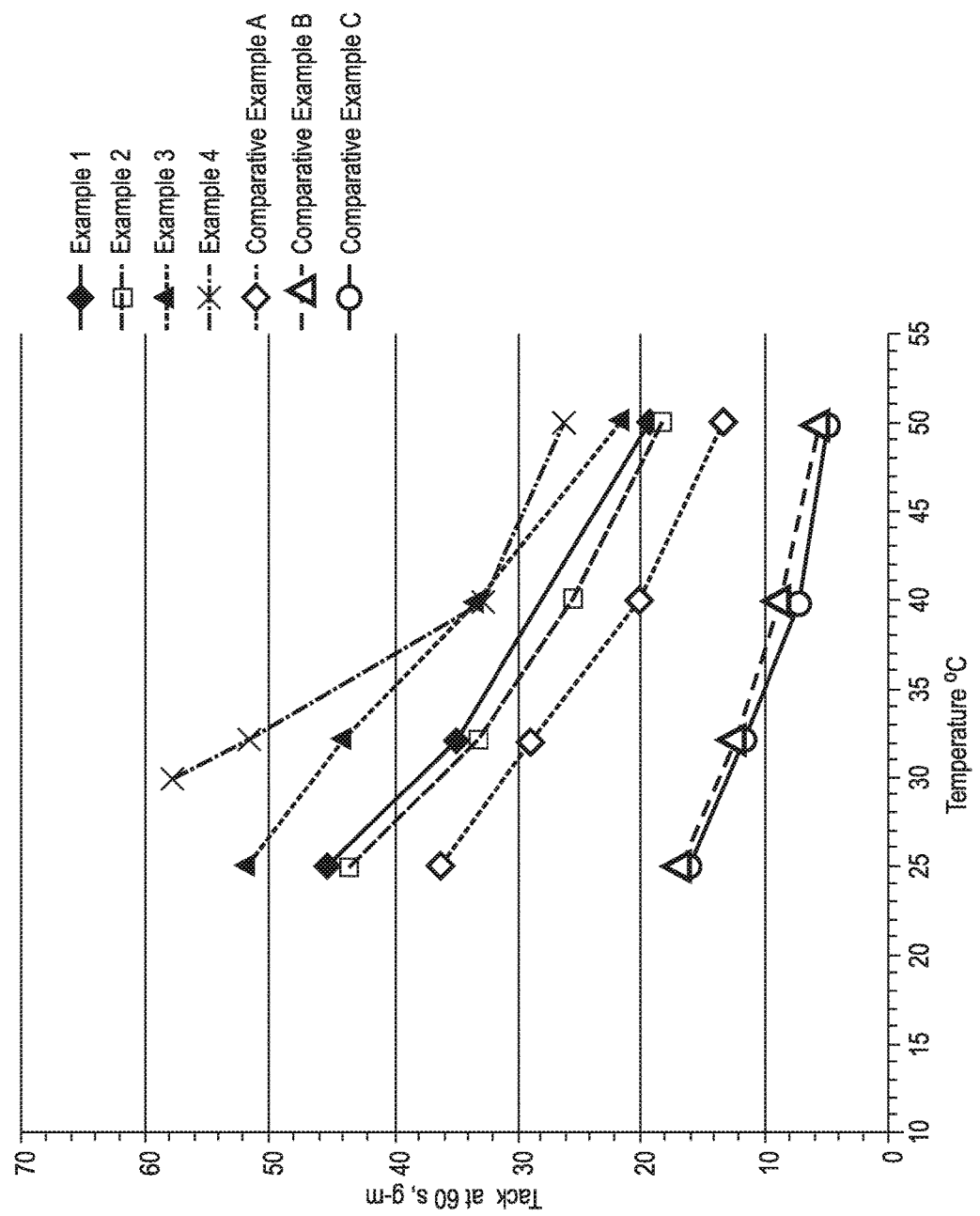
FIG. 3 illustrates tack results of acrylate ink compositions comprising (Examples 1-4) and excluding (Comparative Examples A-C) a trifunctional acrylate monomer.

FIG. 3 shows tack as a function of temperature over the temperature range of 25 to 50° C. of Examples 1-4 and Comparative Examples A-C and the data is summarized below in Table 4.

TABLE 4

60 s Tack

| | 60 s Tack, g-m | | | | |
|---|---|---|---|---|---|
| Ink | 25° C. | 32.2° C. | 40° C. | 50° C. | 60° C. |
| Example 1 | 45.4 | 34.9 | — | 19.0 | 15.2 |
| Example 2 | 43.6 | 33.2 | 25.5 | 18.6 | 15.2 |
| Example 3 | 51.9 | 44.1 | 33.2 | 25.8 | 21.8 |
| Example 4 | >60 | 51.9 | 33.2 | 26.3 | 18.8 |
| Comparative Example A | 36.3 | 29.1 | 20 | 13.3 | 10.7 |
| Comparative Example B | 16.8 | 12.6 | 8.7 | 5.6 | 4.4 |
| Comparative Example C | 15.7 | 11.9 | 7.2 | 5.1 | 3.8 |

As illustrated in FIG. 3, the 60 second tack dependence is approximately linear for Examples 1-4 at temperatures less than about 40° C. However, the surprising and unexpected departure from what can be considered a first-order relationship between tack and temperature among the Example Inks at temperatures above 40° C. is more pronounced for inks of Examples 1-4 as compared to Comparative Examples B and C having similar pigment and total acrylate amount. Hence, the ink compositions of the present disclosure have a tack that is unexpectedly higher at temperatures at and near 50° C. and potentially above 50° C.

It should be noted that although Comparative Examples B and C have pigment amount within the range of the Examples 1-4 of the present application, however Comparative Examples B and C have much lower tack in the temperature range of 25 to 50° C., as compared to those of the Example 1-4.

Table 5 below summarizes 60 second tack and viscosity of Examples 1-4 and Comparative Examples A-C, with the near-zero shear viscosity at 60° C. of Comparative Examples A-C were extrapolated.

TABLE 5

Rheological properties of acrylate ink compositions

| | 60 sec tack (g-m) | | Near-zero shear viscosity (1 rad/s) (cP) | | Energy of Activation (KJ/mol) | |
|---|---|---|---|---|---|---|
| | At 25° C. | At 60° C. | At 25° C. | At 60° C. | At 1 rad/s | At 100 rad/s |
| Example 1 | 45.4 | 15.2 | $1.04 \times 10^6$ | $1.08 \times 10^5$ | 18.5 | 58.7 |
| Example 2 | 43.6 | 15.2 | $6.14 \times 10^6$ | $2.49 \times 10^5$ | 183.1 | 107.3 |
| Example 3 | 51.9 | 21.8 | $2.03 \times 10^6$ | $2.56 \times 10^5$ | 20.3 | 60.8 |
| Example 4 | >60 | 18.8 | $1.78 \times 10^6$ | $4.90 \times 10^5$ | 47.7 | 67.6 |
| Comparative Example A | 36.3 | 10.7 | $3.97 \times 10^5$ | $2.69 \times 10^5$ | 9.2 | 34 |

TABLE 5-continued

Rheological properties of acrylate ink compositions

| | 60 sec tack (g-m) | | Near-zero shear viscosity (1 rad/s) (cP) | | Energy of Activation (KJ/mol) | |
|---|---|---|---|---|---|---|
| | At 25° C. | At 60° C. | At 25° C. | At 60° C. | At 1 rad/s | At 100 rad/s |
| Comparative Example B | 16.8 | 4.4 | $9.64 \times 10^4$ | $8.03 \times 10^4$ | 4.3 | 35.3 |
| Comparative Example C | 15.7 | 3.8 | $1.03 \times 10^5$ | $8.42 \times 10^4$ | 4.8 | 36.5 |

Table 5 shows that among all of the Comparative Examples A-C, Comparative Example A has the highest viscosity, tack and energy of activation, but surprisingly the energy of activation of Comparative Example A is ½ to ⅕ of that of Examples 1-4. It should be further noted that Comparative Example A has pigment present in an amount of 24 weight %, which is greater than that of the Comparative Examples B and C (17 weight %) and Examples 1-4 (15-17.5 weight %) and although the presence of larger quantity of pigment in the Comparative Example A might have increased viscosity and tack, it certainly did not seem to have any significant effect on the energy of activation.

Furthermore, as shown in the Table 5, the Comparative Examples B and C with amounts of both pigment (17 weight %) and total acrylate (69.75 weight % and 75.75 weight %) being in the ranges of the Examples 1-4 (63.49-70.49 weight %), have near-zero shear viscosities about an order of magnitude lower than that of the Examples 1-4. FIG. 3 further illustrates that Comparative Example B and C having similar amount of pigment and total acrylate amount as Examples 1-4 have vastly different tack behavior as a function of temperature. Furthermore, since none of the Comparative Examples A-C comprises a trifunctional acrylate monomer, it is believed that it is the presence of a trifunctional acrylate monomer in combination with a tetrafunctional polyester acrylate oligomer, and optionally a difunctional polyester acrylate oligomer that results in an ink composition having a surprisingly not only high viscosity, but also high tack, and high energy of activation.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. An ink composition, comprising:
   a) 20% or less by weight pigment;
   b) 10% or less by weight dispersant;
   c) from 50% to 75% by weight acrylate, wherein the acrylate comprises a trifunctional acrylate monomer, a tetrafunctional polyester acrylate oligomer, and an optional difunctional polyester acrylate oligomer; and
   d) from 5% to 10% by weight photoinitiator,
   wherein the amounts are based on the total weight of the ink composition,
   wherein an effective amount of the trifunctional acrylate monomer in combination with the tetrafunctional polyester acrylate oligomer, and the optional difunctional polyester acrylate oligomer provides the ink composition with:
   i. a near-zero shear viscosity of from $2 \times 10^6$ cP to $5 \times 10^7$ cP at 25° C., and from $2 \times 10^5$ cP to $4 \times 10^6$ cP at 60° C.,
   ii. a 60 second tack of from 40 g-m to 65 g-m at 25° C., and from 10 g-m to 20 g-m at 60° C., and
   iii. an energy of activation of from 15 to 180 at kJ/mol at 1 rad/s, and from 40 to 120 at kJ/mol at 100 rad/s.

2. The ink composition of claim 1, further comprising:
   1.5% or less by weight stabilizer, based on the total weight of the ink composition; and
   12% or less by weight rheology modifier, based on the total weight of the ink composition.

3. The ink composition of claim 1, wherein the acrylate comprises:
   a) from 2 to 20% by weight a trifunctional acrylate monomer,
   b) from 40 to 70% by weight of a tetrafunctional polyester acrylate oligomer, and
   c) from 0 to 15% by weight of a difunctional polyester acrylate oligomer,
   wherein the amounts are based on the total weight of the ink composition.

4. The ink composition of claim 2, comprising:
   a) from 15% to 20% by weight pigment;
   b) from 4% to 8% by weight dispersant;
   c) from 60% to 70% by weight acrylate with:
      i. from 1 to 18% by weight a trifunctional acrylate monomer,
      ii. from 45 to 70% by weight of a tetrafunctional polyester acrylate oligomer, and
      iii. from 2 to 12% by weight of an optional difunctional polyester acrylate oligomer;
   d) from 5% to 10% photoinitiator;
   e) from 0.1% to 0.3% by weight stabilizer; and
   f) 3% or less by weight rheology modifier,
   wherein the ink composition has a near-zero shear viscosity from $4 \times 10^6$ cP to $1 \times 10^7$ cP at 25° C., and from $4 \times 10^5$ cP to $8 \times 10^5$ cP at 60° C.,
   wherein a 60 second tack of the ink composition is from 45 g-m to 55 g-m at 25° C., and from 10 g-m to 15 g-m at 60° C., and
   wherein the energy of activation of the ink composition is from 15 to 180 at kJ/mol at 1 rad/s and from 40 to 120 at kJ/mol at 100 rad/s.

5. A method of preparing an ink composition, comprising:
   a) preparing an ink base by mixing following components:
      i. 1.5% or less by weight of a stabilizer,
      ii. 10% or less by weight of a dispersant, and
      iii. from 50% to 75% by weight of an acrylate comprising a trifunctional acrylate monomer, a tetrafunctional polyester acrylate oligomer, and an optional difunctional polyester acrylate oligomer;
   b) adding from 5% to 10% by weight photoinitiator slowly to the ink base;
   c) adding 20% or less by weight of a pigment to the ink base to form a pigmented ink base; and
   d) optionally adding 12% or less by weight rheology modifier to the pigmented ink base,
   wherein the amounts are based on a total weight of the ink composition,
   wherein an effective amount of the trifunctional acrylate monomer in combination with the tetrafunctional polyester acrylate oligomer, and the optional difunctional polyester acrylate oligomer provides the ink composition with:
i. a near-zero shear viscosity of from $2\times10^6$ cP to $5\times10^7$ cP at 25° C., and from $2.\times10^5$ cP to $4.\times10^6$ cP at 60° C.,
ii. a 60 second tack of from 40 g-m to 65 g-m at 25° C., and from 10 g-m to 20 g-m at 60° C., and
iii. an energy of activation of from 15 to 180 at kJ/mol at 1 rad/s, and from 40 to 120 at kJ/mol at 100 rad/s.

6. The method of claim 5, wherein:
a) the stabilizer is present in an amount of from 0.1% to 0.3% by weight;
b) the dispersant is present in an amount of from 4% to 8% by weight;
c) the acrylate is present in an amount of from 60% and 70% by weight with:
   i. from 5 to 15% by weight a trifunctional acrylate monomer,
   ii. from 57 to 70% by weight of a tetrafunctional polyester acrylate oligomer, and
   iii. from 4 to 10% by weight of an optional difunctional polyester acrylate oligomer;
d) the photoinitiator is present in an amount of from 5% to 10% by weight;
e) the pigment is present in an amount of from 15% to 20% by weight; and
f) the rheology modifier is present in an amount of 3% or less by weight; and
wherein the trifunctional acrylate monomer in combination with the tetrafunctional polyester acrylate oligomer, and the difunctional polyester acrylate oligomer provides the ink composition with:
   i. a near-zero shear viscosity of from $4\times10^6$ cP to $1\times10^7$ cP at 25° C., and from $4\times10^5$ cP to $8\times10^5$ cP at 60° C.,
   ii. a 60 second tack of from 45 g-m to 55 g-m at 25° C., and from 10 g-m to 15 g-m at 60° C., and
   iii. an energy of activation of from 15 to 180 at kJ/mol at 1 rad/s, and from 40 to 120 at kJ/mol at 100 rad/s.

7. A method of printing using a variable data digital lithographic printing device, comprising:
I. applying an ink composition at a first temperature to a reimageable surface of an imaging member; and
II. transferring the ink composition from the reimageable surface to a substrate at a second temperature, the second temperature being lower than the first temperature,
wherein the ink composition does not require pre-curing before transferring the ink composition from the reimageable surface to the substrate,
wherein the ink composition comprises:
a) 20% or less by weight pigment;
b) 10% or less by weight dispersant;
c) from 50% to 75% by weight acrylate, wherein the acrylate comprises a trifunctional acrylate monomer, a tetrafunctional polyester acrylate oligomer, and an optional difunctional polyester acrylate oligomer; and
d) from 5 to 10% by weight photoinitiator,
wherein the amounts are based on the total weight of the ink composition,
wherein an effective amount of the trifunctional acrylate monomer in combination with the tetrafunctional polyester acrylate oligomer, and the optional difunctional polyester acrylate oligomer provides the ink composition with:
i. a near-zero shear viscosity of from $2\times10^6$ cP to $5\times10^7$ cP at 25° C., and from $2\times10^5$ cP to $4\times10^6$ cP at 60° C.,
ii. a 60 second tack of from 40 g-m to 65 g-m at 25° C., and from 10 g-m to 20 g-m at 60° C., and
iii. an energy of activation of from 15 to 180 at kJ/mol at 1 rad/s, and from 40 to 120 at kJ/mol at 100 rad/s.

8. The method of claim 7, wherein the acrylate comprises:
i. from 2 to 20% by weight a trifunctional acrylate monomer,
ii. from 40 to 70% by weight of a tetrafunctional polyester acrylate oligomer, and
iii. from 0 to 15% by weight of a difunctional polyester acrylate oligomer,
wherein the amounts are based on the total weight of the ink composition.

9. The method of claim 7, wherein the second temperature is from 25° C. to 60° C., and wherein the 60 second tack of the acrylate ink composition at the second temperature is about 1.3 times lower per about 7-8° C. increase from the first temperature.

10. The method of claim 7, wherein the second temperature is from 25° C. to 60° C., wherein the second temperature is lower than the first temperature, and wherein the viscosity of the acrylate ink composition at the second temperature is about 1.2 times lower per about 10° C. increase from the first temperature.

11. The method of claim 10, wherein the first temperature is at least 20° C. higher than the second temperature.

12. The method of claim 10, wherein the first temperature is at least 50° C. higher than the second temperature.

13. The method of claim 10, wherein the first temperature is at least 80° C. higher than the second temperature.

14. The method of claim 10, wherein the ink has a viscosity from $2\times10^6$ cP to $5\times10^7$ cP at the second temperature ° C., and from $2.\times10^5$ cP to $4.\times10^6$ cP at the first temperature, and
wherein a 60 second tack of the ink composition is from 40 to 65 g-m at the second temperature, and from 10 to 20 g-m at the first temperature.

15. The method of claim 7, wherein the acrylate further comprises at least one of an acrylate monomer, acrylate polymer, acrylate oligomer, and mixtures thereof.

16. The method of claim 7, where the ink composition consists essentially of:
20% or less by weight pigment;
10% or less by weight dispersant;
from 50% to 75% by weight acrylate, wherein the acrylate is a mixture of a trifunctional acrylate monomer, a tetrafunctional polyester acrylate oligomer, and an optional difunctional polyester acrylate oligomer;
from 5% to 10% by weight photoinitiator;
1.5% or less by weight stabilizer; and
12% or less by weight rheology modifier,
wherein the amounts are based on a total weight of the ink composition,
wherein an effective amount of the trifunctional acrylate monomer in combination with the tetrafunctional polyester acrylate oligomer, and the optional difunctional polyester acrylate oligomer provides the ink composition with:
i. a near-zero shear viscosity of from $2\times10^6$ cP to $5\times10^7$ cP at 25° C., and from $2.\times10^5$ cP to $4.\times10^6$ cP at 60° C.,
ii. a 60 second tack of from 40 g-m to 65 g-m at 25° C., and from 10 g-m to 20 g-m at 60° C., and an energy of activation of from 15 to 180 at kJ/mol at 1 rad/s, and from 40 and 120 at kJ/mol at 100 rad/s.

* * * * *